United States Patent [19]
Allen et al.

[11] 3,967,724
[45] July 6, 1976

[54] APPARATUS FOR ORIENTING TAPERED ARTICLES
[75] Inventors: Kenneth M. Allen; Brian R. Fijalkowski, both of Newberg, Oreg.
[73] Assignee: Kenneth M. Allen, Newberg, Oreg.
[22] Filed: Jan. 14, 1975
[21] Appl. No.: 540,802

[52] U.S. Cl. ................................. 198/268; 198/40; 198/241; 198/276; 198/285; 198/288
[51] Int. Cl.² ......................................... B65G 47/24
[58] Field of Search .......... 198/236, 237, 239, 241, 198/242, 257, 243, 261, 262, 267, 268, 276, 277, 282, 283, 285, 288, 40; 209/80, 82, 88 R; 33/174 E

[56] References Cited
UNITED STATES PATENTS

| | | | |
|---|---|---|---|
| 2,362,517 | 11/1944 | Woodberry | 198/285 |
| 2,734,619 | 2/1956 | Labombarde | 198/239 |
| 3,101,832 | 8/1963 | Wyle et al. | 198/250 |
| 3,119,487 | 1/1964 | Wyle et al. | 198/239 |
| 3,181,710 | 4/1972 | Schmidt | 198/288 |
| 3,468,415 | 9/1969 | Sarver | 209/80 |
| 3,581,867 | 6/1971 | Filz | 198/288 |
| 3,655,027 | 4/1970 | Douglas et al. | 198/298 |
| 3,742,610 | 7/1973 | Calame | 33/174 E |
| 3,838,292 | 9/1974 | Sullivan | 198/40 |

*Primary Examiner*—John J. Love
*Assistant Examiner*—Joseph E. Valenza
*Attorney, Agent, or Firm*—Klarquist, Sparkman, Campbell, Leigh, Hall & Whinston

[57] ABSTRACT

Tapered ears of corn are moved one-at-a-time lengthwise into engagement first with a feeler-positioner and then with a feeler, and if the small end of an ear is forward, the feeler engages only the periphery of the ear and is moved slowly, while if the larger, butt end is first, the feeler engages the end or corner portion and is moved much more rapidly. This higher velocity of the feeler is sensed by an electro magnetic velocity transducer, and a pair of discs are actuated to grip the ear and turn it end-for-end. In one embodiment, the feeler-positioner is a pair of wheels which engage each ear and lift the feeler in accordance with the diameter and taper of that ear. In an alternate embodiment, the feeler-positioner is in the form of a plate which engages the ear and lifts the feeler in accordance with the diameter and taper of the ear.

16 Claims, 20 Drawing Figures

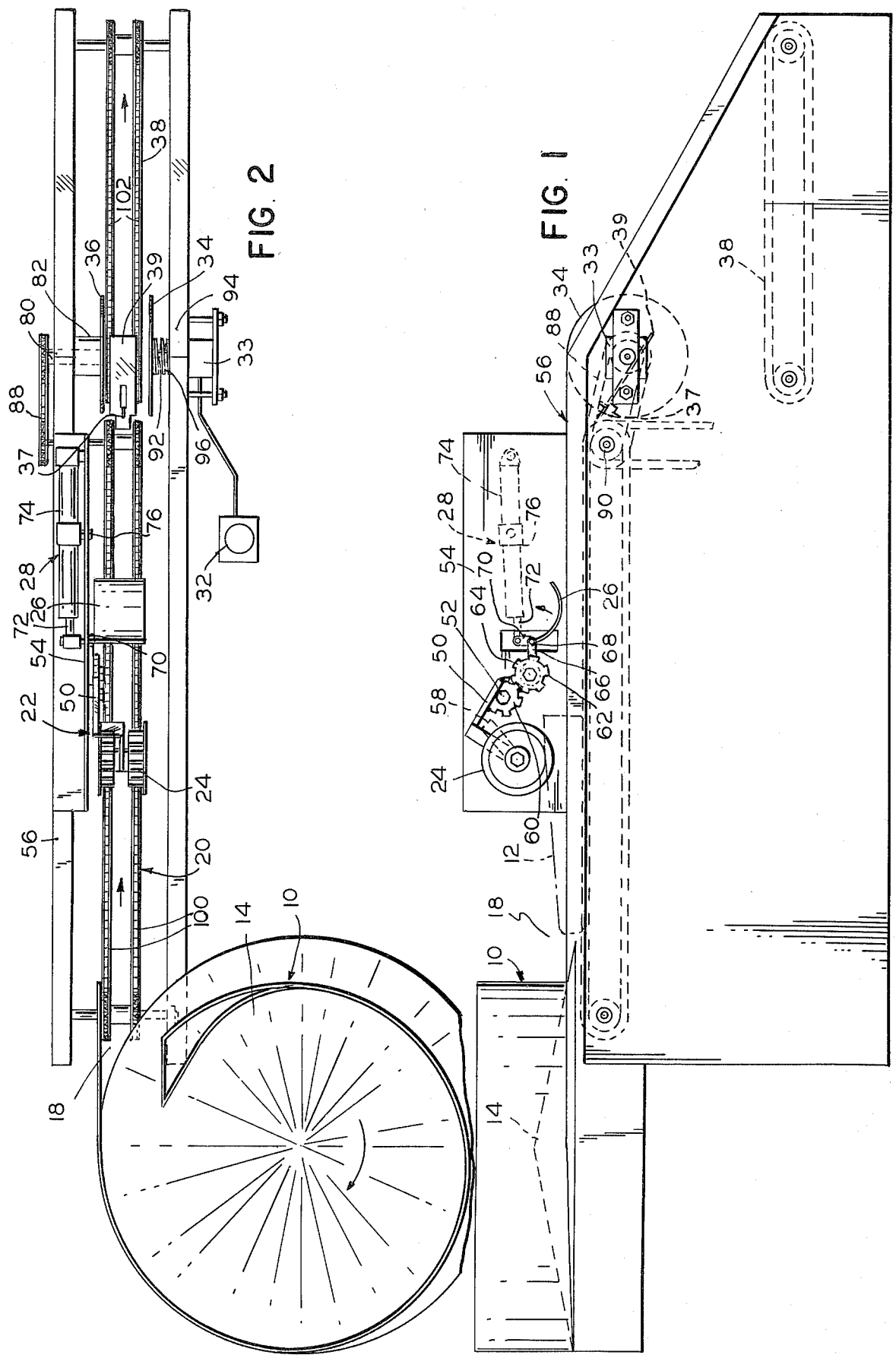

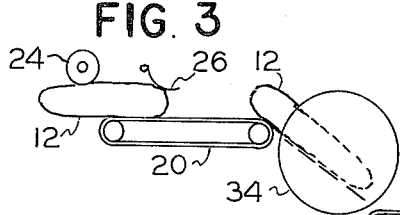
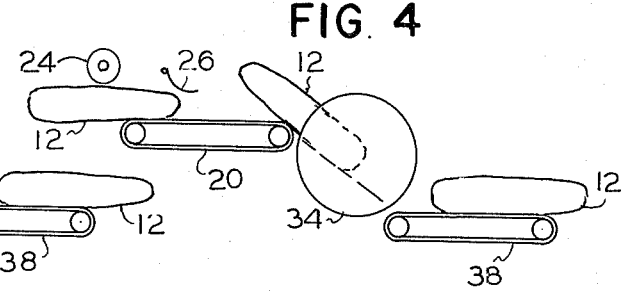
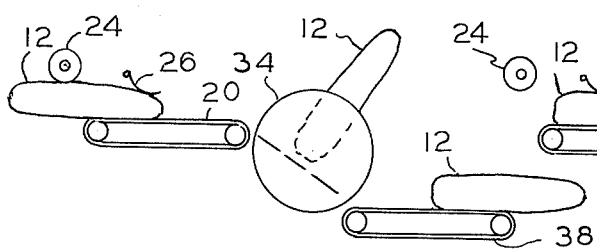
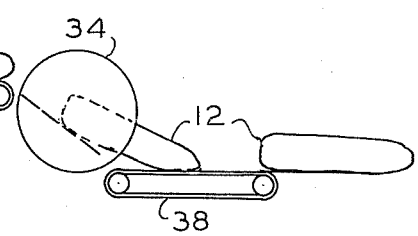
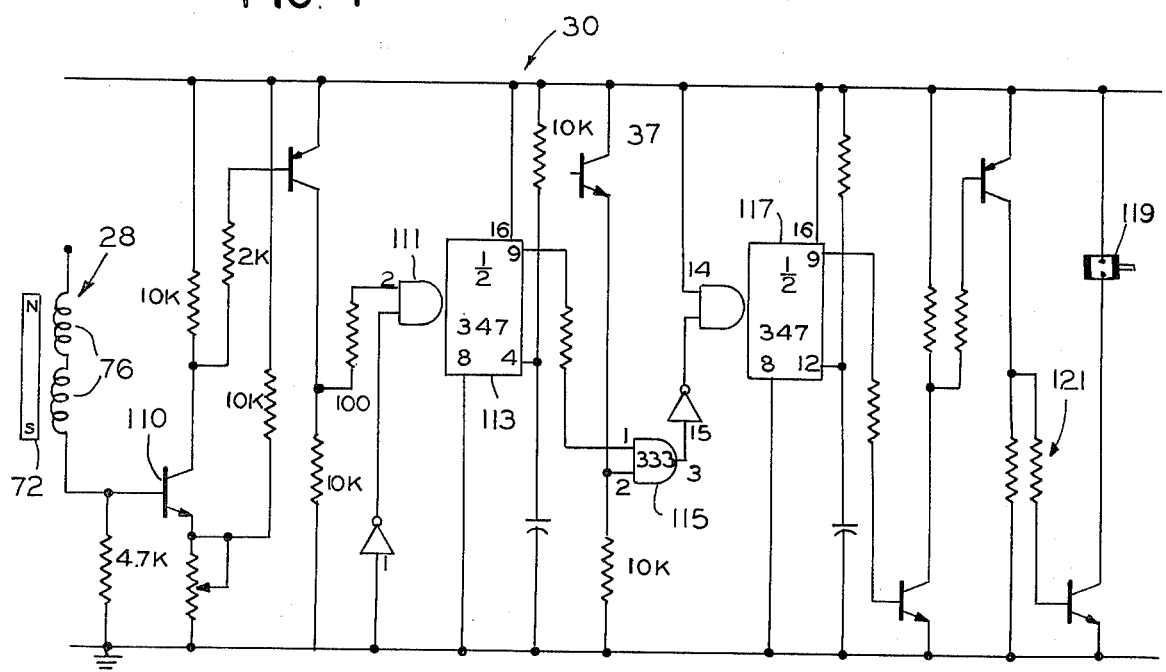

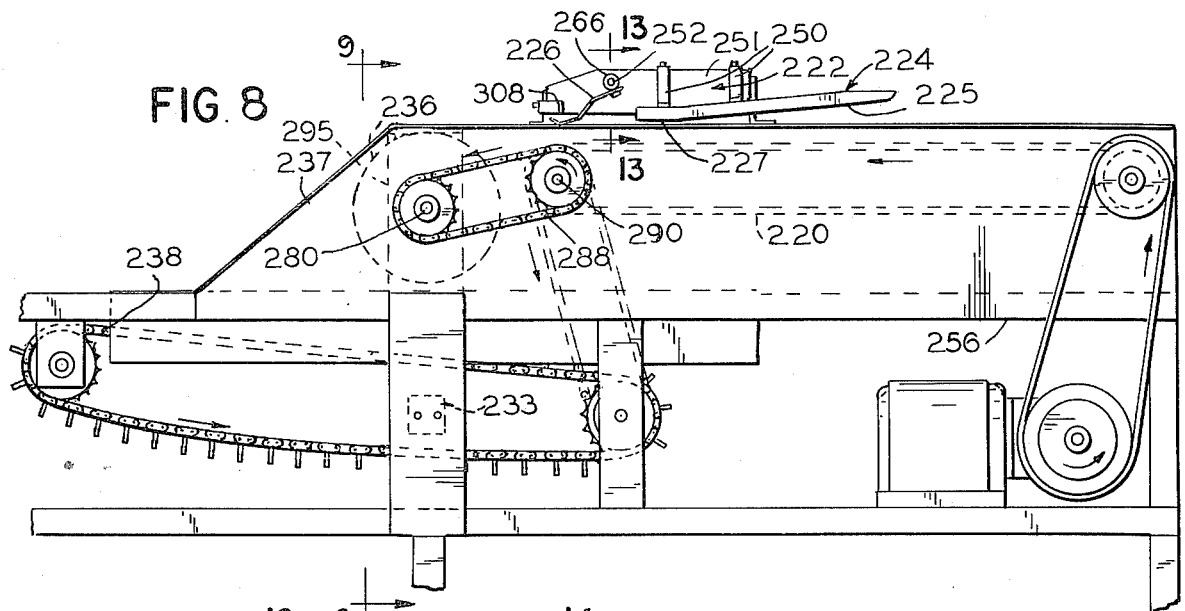
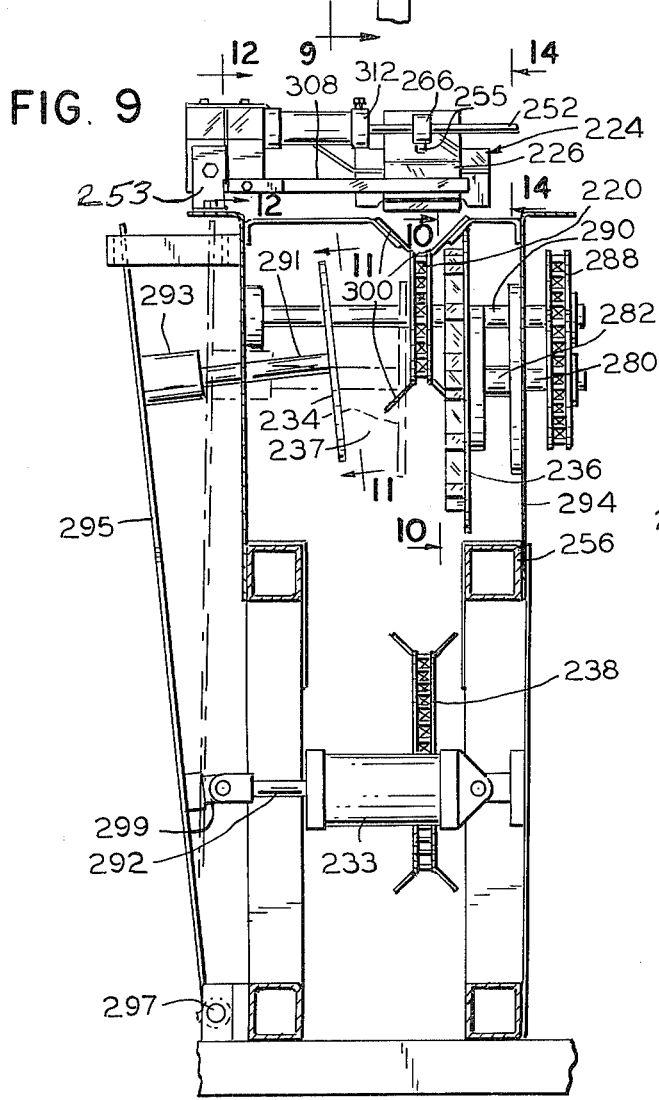
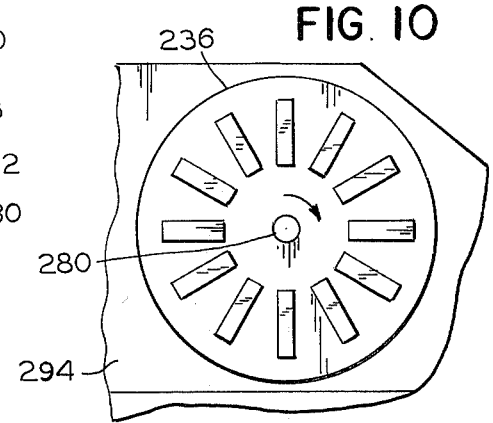
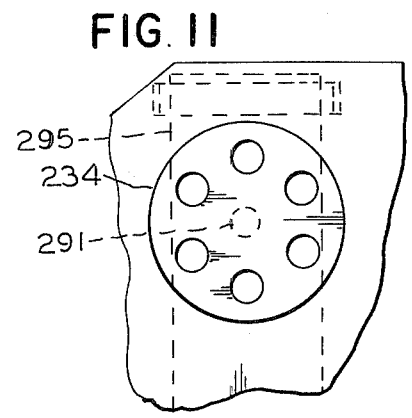

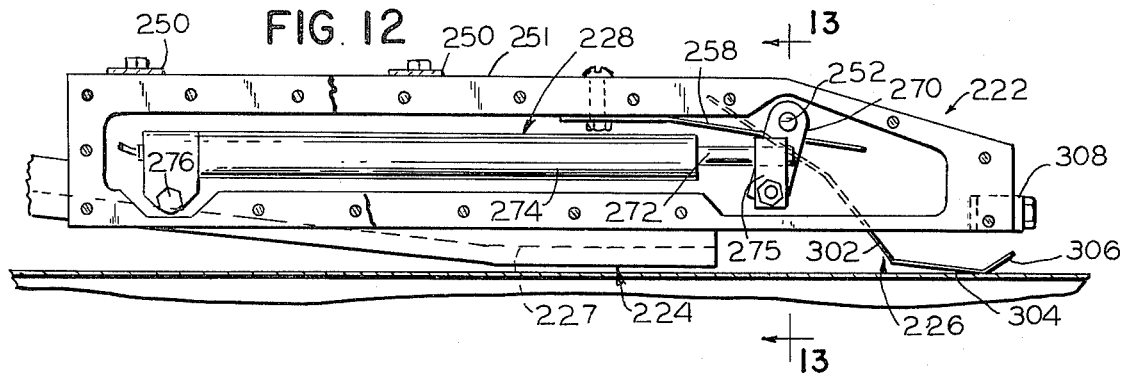
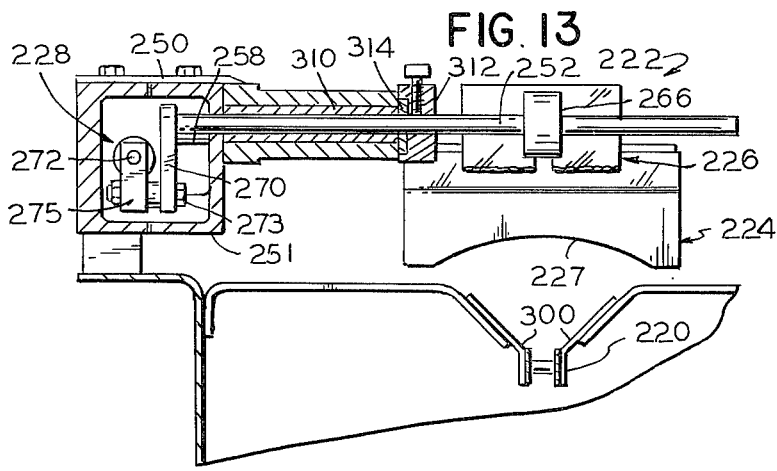
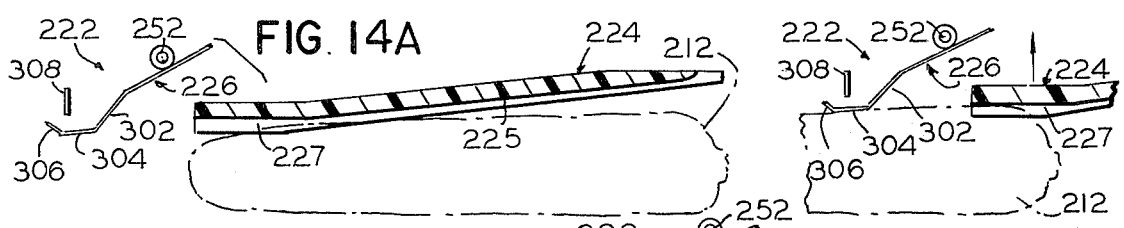
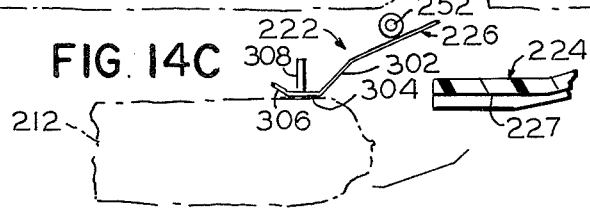
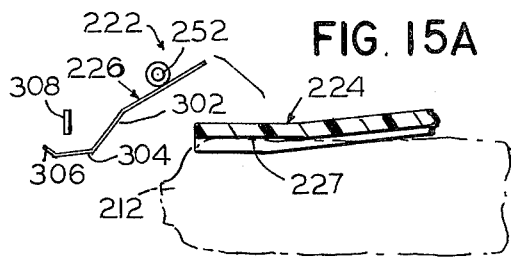
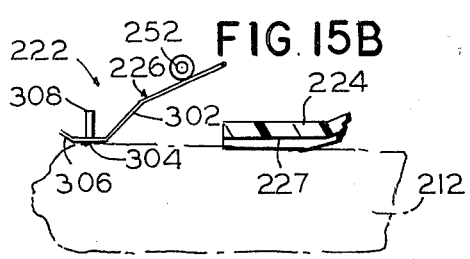

APPARATUS FOR ORIENTING TAPERED ARTICLES

DESCRIPTION

This invention relates to an improved apparatus for orienting tapered articles, and has for an object thereof the provision of improved apparatus for orienting tapered articles.

Another object of the invention is to provide an apparatus including a feeler moved more rapidly when engaged by one portion of an article than by another and velocity responsive means adapted to respond to the difference in velocity of the feeler.

A further object of the invention is to provide an apparatus wherein a pair of opposed clamps grip and turn an elongated article end-for-end to orient the article.

Another object of the invention is to provide a hopper having a tapered bottom for feeding ears of corn endwise onto a conveyor.

Another object of the invention is to provide improved apparatus for orienting ears of corn including contacting means movable by an ear of corn in accordance with the diameter of the ear and carrying a feeler which is moved more rapidly by the butt end of the ear than by the small end thereof.

Another object of the invention is to provide an improved apparatus for orienting ears of corn including roller means engaged and pushed upwardly by an ear of corn advanced along a path and carrying a feeler to position the feeler.

Another object of the invention is to provide an improved apparatus for orienting ears of corn including a velocity responsive transducer mounted in a housing pivotal on an axis parallel to a conveyor, a contacting plate carried by the housing in a position adapted to be engaged by each ear of corn and pushed out of the path of the ear to an extent proportional to the diameter of that ear of corn to pivot the housing accordingly, and a pivotal feeler carried by the housing and movable by the ear out of the path thereof, rapidly when the butt end of the ear is forward and more slowly when the small end of the ear is forward.

Another object of the invention is to provide an improved apparatus for orienting ears of corn wherein the ears are fed to endwise positions on a first conveyor by a hopper having a tapered bottom, a first conveyor advances the ears to a chute through which the ears move to a second conveyor, and a feeler along the first conveyor is moved sufficiently rapidly when engaged by a butt-end-first ear to actuate a velocity sensor to cause a pair of discs at the chute to grip the butt end portion of that ear, turn the ear end-for-end and release it on the second conveyor.

In the drawings:

FIG. 1 is a fragmentary, side elevation view of an improved apparatus for orienting tapered articles;

FIG. 2 is a fragmentary, top plan view of the apparatus of FIG. 1;

FIG. 3 is a schematic side elevation view of the apparatus of FIG. 1;

FIGS. 4, 5 and 6 are schematic, side elevation views of the apparatus of FIG. 1;

FIG. 7 is a diagrammatic view of an electrical circuit forming a portion of the apparatus of FIG. 1;

FIG. 8 is a fragmentary, side elevation view of an improved apparatus for orienting tapered articles forming an alternate embodiment of the invention;

FIG. 9 is a vertical sectional view taken along line 9—9 of FIG. 8;

FIG. 10 is an enlarged, vertical sectional view taken along line 10—10 of FIG. 9;

FIG. 11 is an enlarged, vertical sectional view taken along line 11—11 of FIG. 9;

FIG. 12 is an enlarged, vertical sectional view taken along line 12—12 of FIG. 8;

FIG. 13 is an enlarged, vertical sectional view taken along line 13—13 of FIG. 12;

FIGS. 14A, 14B and 14C are schematic views of a portion of the apparatus of FIG. 8 with an ear of corn being advanced small-end first;

FIGS. 15A and 15B are schematic views of a portion of the apparatus of FIG. 8 with an ear of corn being advanced butt-end first;

Figure 16:
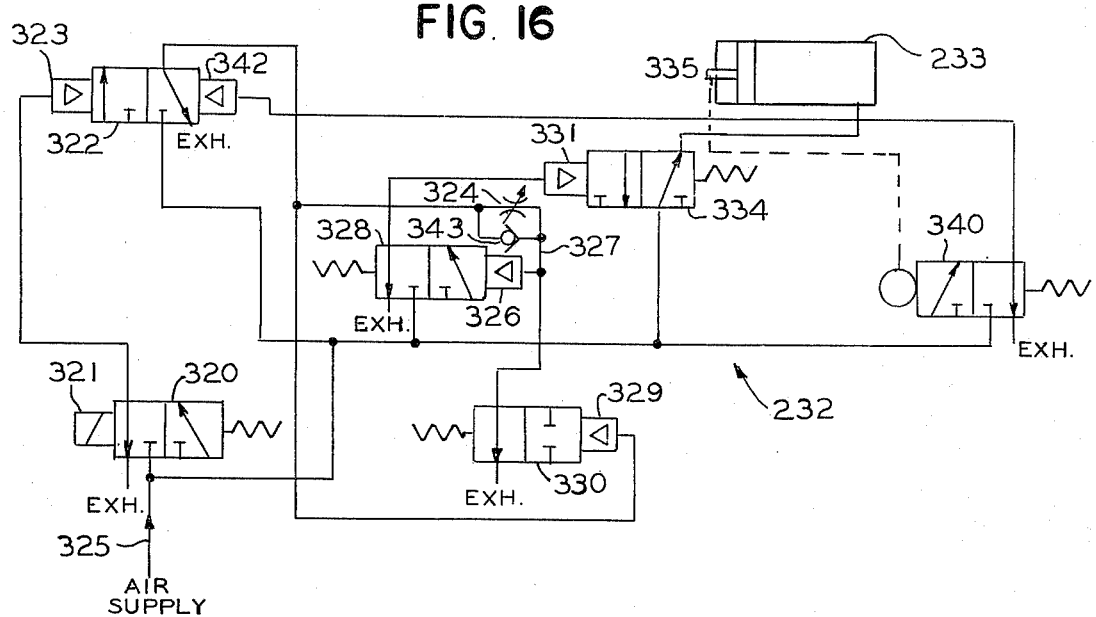
FIG. 16 is a schematic view of a pneumatic circuit of the apparatus of FIG. 8; and, FIG. 17 is a schematic view of an electrical circuit of the apparatus of FIG. 8.

Referring now in detail to the drawings there is shown therein an improved apparatus for orienting tapered articles forming one embodiment of the invention and including a hopper 10 (FIGS. 1 and 2) into which tapered articles, ears 12 in the specific example disclosed, are placed randomly. The hopper has a conical bottom 14, which is rotated to roll the ears to peripheral wall 10 and move the ears endwise through a tangential guideway 18 onto a conveyor 20. The conveyor is advanced at a constant rate of speed, and advances the ears seriatim in spaced positions into engagement with a feeler mechanism 22 including a feeler-positioner in the form of height adjusting rolls 24 and a pivotal feeler arm 26. The rolls 24 are positioned only a short distance from the ear, are engaged by the ear, and are pushed up thereby to raise the feeler arm just before the end of the ear reaches the feeler arm to a position in which the feeler arm does not extend downwardly quite far enough to be in the path of the small end of the ear if the ear is small-end-first, but does extend downwardly sufficiently to be in the path of the large end of the ear if the ear is large-end-first. Some ears have a portion of the stem still on the butt ends, and the feeler does not extend into the path of the stem portion which has usually a diameter about one-half that of the butt end portion of the ear. Ears of corn vary somewhat in shape from one to another, but almost without exception the corner portion of the butt end has either a blunt (untapered) end or a much more pronounced taper than the small end of the ear, and the taper of the least tapered butt ends is much greater than the taper of the most tapered small end. Each ear engages the feeler arm and swings it upwardly. If the ear swinging the feeler arm is small-end-first, as shown in FIG. 3, the feeler arm engages only the periphery of the ear and the ear swings the arm relatively slowly and, if the ear swinging the feeler arm is butt-end-first, as the middle ear shown in FIGS. 4, 5 and 6, the end or corner portion of the butt end of the ear engages the feeler arm and swings it rapidly.

The arm is coupled to a voltage-generating linear velocity transducer 28 (FIGS. 1 and 2) which creates a voltage pulse from swinging of the arm, the amplitude of the pulse being proportional to the velocity of the swing. A circuit 30 (FIG. 7) responds only to a pulse of higher amplitude to actuate a valve 32 to cause a pneumatic cylinder 33 to press on idler disc 34 toward a driving disc 36 to clamp the butt end portion of the ear therebetween, the valve being actuated when the ear contacts a transistor limit switch 37 at the end of the conveyor 20. The disc 36 rotates the ear and the driven disc 34 to turn the ear end-for-end. After turning the ear end-for-end, the valve 32 is actuated to reverse the cylinder 33 and the ear is dropped through a chute area 39 onto a second conveyor 38 which carries it small-end-first into a machine (not shown) for cutting the kernels from the cob. If the ear is small-end-first, it continues in that direction as it drops through the chute area 39.

The pair of rolls 24 are mounted on an arm 50 fixed rigidly to a shaft 52 journalled on frame 54 detachably mounted on main frame 56 of the apparatus. A dashpot 58 connected to the frame 54 and the arm 50 permits rapid raising of the rolls 24 while damping somewhat descent of the rolls by gravity. A gear 60 keyed to shaft 52 meshes with gear 62 keyed to shaft 64 journalled on the frame 54. An arm 66 keyed to the shaft 64 mounts the feeler arm 26 pivotally at its free end on a shaft 68, the feeler arm being rigidly attached to the shaft 68. An arm 70 of non-magnetic material keyed to the shaft 68 is pivotally connected to outer end of a permanent magnet rod or core 72 of the transducer 28, coil 74 of the transducer 28 being pivotally mounted on the frame by pin 76. When the feeler arm 26 is pivoted by an ear, the rod 72 is pulled farther out of the coil 74 to generate a voltage in the transducer. The transducer is commercially available, and differentiates between slow pivoting for a tapered-end-first ear and a rapid pivoting from a butt-end-first ear. The transducer 28 may be a model 112-000 linear velocity transducer sold by Trans-Tek, Incorporated.

The disc 36 FIG. 2 has a radially ribbed gripping face, and is keyed to a shaft 80 journalled by a radial and thrust bearing 82 mounted on the frame 56. A chain and sprocket drive 88 driven by shaft 90 of the conveyor 20 rotates the disc 36 continuously. The disc 34 is rotatably mounted on piston rod 92 of a piston (not shown) in the cylinder 33 which is mounted on side frame member 94. A spring 96 urges the disc 34 toward gripping engagement, and the cylinder 33 is of the single action type in which, when air under pressure is supplied to the cylinder, the piston holds the disc 34 in a retracted position against the action of the spring 92. When the valve 32 connects the cylinder 33 to exhaust, the spring pushes the disc 34 toward the disc 36 to a gripping position. The position of the limit switch 37 is such that the discs 34 and 36 clamp each butt-end-first ear 12 before the forward end of the ear has travelled past the axis of rotation of the discs any substantial distance. The valve 32 is actuated to open the discs just after the ear has been turned at least past the vertical and preferably at about 135° when the ear is substantially horizontal or just past its horizontal position. The conveyor 20 includes a pair of chains 100, and the conveyor 38 includes a pair of chains 102. The chains of each pair are spaced apart just sufficiently to somewhat cradle the ears resting thereon.

The circuit 30 (FIG. 7) includes a transistor filter circuit 110 which discriminates between the higher voltage generated by the linear velocity transducer 28 when the feeler arm is actuated by a butt-end-first ear and the lower voltage when the feeler arm is actuated by a small-end-first ear. When the higher voltage is generated by the transducer, the circuit 110 applies an actuating voltage to "and" gate 111 to actuate a timing multivibrator 113, which then sets up an "and" gate 115, and, when the transistor limit switch 37 is actuated by the ear, it actuates a second timing multivibrator 117, which then actuates through amplifying circuit 121 a solenoid 119 of the valve 32 to cause the cylinder 33 to press the idler disc 34 toward the driving disc 36. When the ear has been gripped and turned, the multivibrator 117 times out to drop out the solenoid 119. This retracts the disc 34 to release the ear. When the lower voltage generated by the linear velocity transducer is actuated by a small-end-first ear, the voltage is not high enough to pass through the circuit 110 and actuate the gate 111.

EMBODIMENT OF FIGS. 8–17

An improved apparatus for orienting tapered articles forming an alternate embodiment of the invention is generally similar to that of FIGS. 1–7, and includes a conveyor 220. The conveyor is driven at a constant rate of speed, and advances ears of corn 212 seriatim into engagement with a feeler mechanism 222 including a grooved, elongated, contacting shoe 224 forming a feeler-positioner and a pivotal feeler arm 226 positioned close to the feeler-positioner.

The shoe 224 is of a low friction material, and has a sloping entrance portion 225 allowing the forward end of each ear 212 to move in under the shoe a substantial distance before contacting the shoe. The shoe also includes a short, lowermost, operating portion 227 which is close to the feeler arm 226 and positions the height of the feeler arm at all times that the forward end of the ear and the portions of the ear just to the rear of the forward end of the ear are engaging the feeler arm. The engagement of the operating portion 227 so positions the height of the arm 226 that, when the ear is small-end-first, the arm does not extend downwardly enough to be in the path of the small end of the ear and the arm first engages the periphery of the ear. When the ear is butt-end-first, the operating portion 227 so positions the height of the arm 226 that the arm is in the path of the large or butt end of the ear and is engaged by that end or forward corner portion of the ear.

Figure 17:
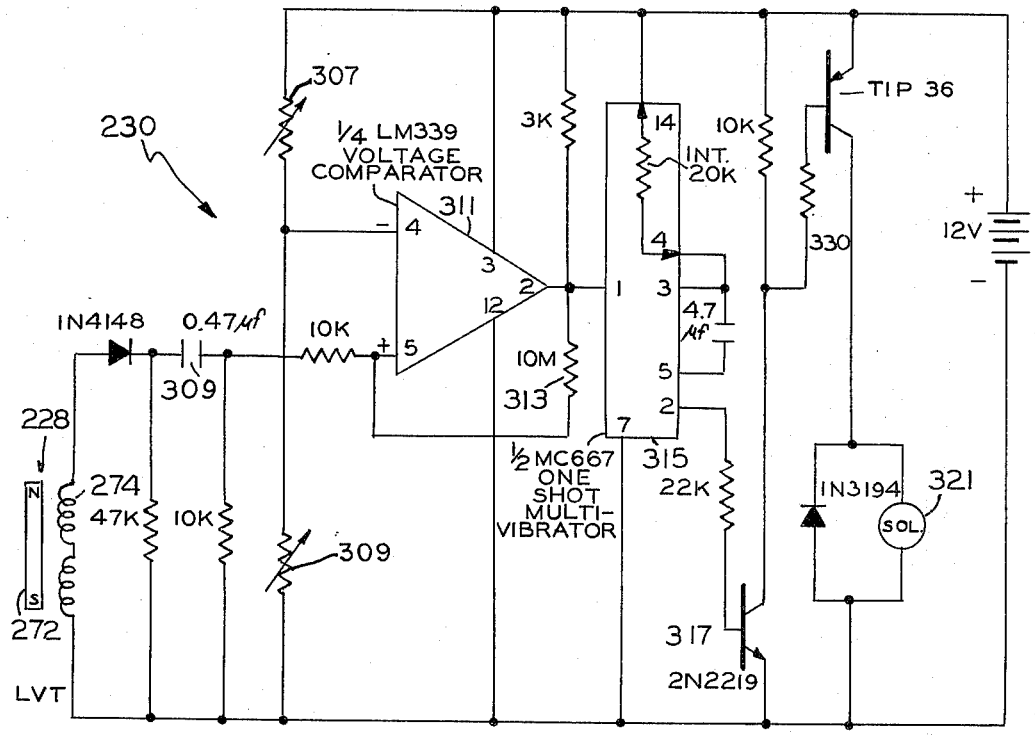

Each ear engages the feeler arm and swings it upwardly. If the ear swinging the feeler arm is small-end-first, the actual end face of the ear does not engage the arm, and the ear swings the arm relatively slowly and, if the ear swinging the feeler arm is butt-end-first, the forward end of the ear engages the arm and the ear swings the arm rapidly. The arm is coupled to a velocity transducer 228 which responds only to rapid swinging of the arm. When the arm is swung rapidly the transducer forms a pulse to trigger an electronic circuit 230 (FIG. 17) to actuate a pneumatic circuit 232 (FIG. 16) to cause a pneumatic cylinder 233 to press a lightweight idler disc 234 (FIGS. 9 and 11) toward a driving disc 236 to clamp the butt end portion of the ear therebetween, the cylinder being actuated when the ear approaches the discs and starts to tilt down. The disc 236 rotates the ear and the driven disc 234 to turn the ear end-for-end. After turning the ear end-for-end, the circuit 232 is actuated to reverse the cylinder 233 to release the ear, and the ear is dropped through a chute portion 237 onto a second conveyor 238 which carries it small-end-first into a machine (not shown) for cutting the kernels from the cob.

The contact shoe 224 is mounted on rigid arms 250 fixed to a lightweight housing 251 pivotal on posts 253 of main frame 256 of the apparatus. A wedging brake 258 (FIG. 12) connected to housing 251 permits rapid raising of the arm 226 while slowing the last portion of descent of the arm 226 by gravity. A collar 266 keyed to shaft 252 mounts the feeler arm 226 pivotally relative to the frame, the feeler arm being rigidly attached to the collar by screw 255. An arm 270 (FIGS. 12 and 13) keyed to the shaft 252 is pivotally connected by a pin 273 to an ear 275 fixed on the outer end of a permanent magnet rod or core 272 of the transducer 228, coils 274 of the transducer 228 being pivotally mounted on the frame by pin 276. When the feeler arm 226 is pivoted by an ear, the rod 272 is pulled farther out of the coil 274 to generate a voltage in the transducer. The transducer is commercially available, and is like the transducer 28. The circuit 230 (FIG. 17) differentiates between slow pivoting for a small-end-first ear, and a rapid pivoting from a butt-end-first ear.

The disc 236 (FIGS. 9 and 10) has a radially ribbed gripping face, and is keyed to a shaft 280 journalled by a radial and thrust bearing 282 mounted on the side frame 294. A chain and sprocket drive 288 driven by shaft 290 of the conveyor 220 rotates the disc continuously. The disc 234 is mounted on a shaft 291 journalled in bearing 293 mounted on the upper end of a spring arm 295 pivotal on pin 297. A piston rod 292 of a piston 335 in the cylinders 233, which is mounted on the side frame members 294, is connected pivotally to the spring arm 295 by a clevis joint 299. The cylinder 233 is of the single action type in which, when air under pressure is supplied to the cylinder, the piston holds the disc 234 in an extended position. When the pneumatic circuit 232 connects the cylinder 233 to exhaust, the piston is spring retracted and pivots the arm 295 clockwise, as viewed in FIG. 9, to push the disc 234 in a gripping direction toward the disc 236 to resiliently push the ear of corn into engagement with the disc 236. The circuit 232 actuates the cylinder 233 to retract the disc 234 after the butt end of the ear has been turned at least past the vertical and preferably at about 135° when the ear is substantially horizontal or just past its horizontal position.

The conveyor 220 includes arms 300 which form Y's, which cradle the ears resting thereon. This keeps the ears centered relative to the arm 226. The arm 226 has a sloping, ear-engaging portion 302 that, when the arm is in its normal, farthest downward position, forms an angle of about 30° with the vertical. The arm 226 also has a dwell portion 304 and a sloping end portion 306. The dwell portion 304 is positioned quite close to a stop 308 fixed to the housing 251 but not in engagement therewith when both the arm 226 and the portion 227 are in engagement with the ear. Then, as the ear moves out of engagement with the portion 227 of the shoe, the shoe and the stop 308 drop only a short distance until the stop 308 engages the arm 226, a distance insufficient to actuate the turner, the arm being supported by the ear. Then, after the ear travels out from under the arm 226, the shoe 224, the arm 226 and the stop return by gravity to their normal positions shown in FIG. 14A, the arm 270 engaging the wedge 258 and slowing to a stop at the least end portion of the return. The core 272 bottoms out to stop the downward movement in the normal positions of these components. The shaft 252 (FIG. 13) is journalled in a bearing 310 carried by the housing 251, and a cupped collar 312 contains a rawhide seal 314.

When the feeler arm 226 is swung at a high velocity by a butt-end-first ear, the magnet 272 (FIGS. 12 and 17) of the transducer 228 is moved at a high velocity relative to the coils 274 to generate a voltage pulse sufficient to pass a resistance-capacitance filter 309 and trigger a known, commercially available, non-inverting voltage comparator 311 of the type having hysteresis, an adjustable reference voltage being applied to the comparator by variable resistors 307 and 309. The comparator feeds back through resistor 313 and goes fully on to trigger a known, commercially available, multivibrator 315 which has a resistance-capacitance network of such a value as to provide an output pulse of sufficient duration relative to the speed of the conveyor and distance between the feeler arm and the turning discs (about 70 milliseconds in one constructed embodiment), to enable the ear to be inverted. The output of the multivibrator is amplified by transistors 317 and 319 to energize solenoid 321 of valve 320. The solenoid 321 shifts valve 320 to connect a pilot 323 of valve 322 to an air supply line 325 to shift the valve 322. The valve 322 then connects the air supply line 325 to a timer in the form of a needle valve 324 to a pilot 326 of a valve 328. After the desired delay, the pressure builds up in line 327 to the pilot 326, valve 330 having been actuated by shift of the valve 322 to supply air under pressure to pilot 329 to close off the line 327 from exhaust, the pilot 326 shifting the valve 328. The valve 328 then connects a pilot 331 of valve 334 to the air supply line 325 to shift the valve 334, and the valve 334 exhausts the cylinder 233 to cause the piston 335 to retract to the right, as viewed in FIG. 16, to swing the spring arm 295 clockwise, as viewed in FIG. 9, to clamp the butt-end-first ear against the driving disc 236. The disc 236 then inverts the ear. The multivibrator 315 (FIG. 17) times out very soon after the disc 234 moves the ear into engagement with the disc 236. This drops out the solenoid 321 to cause the valve 320 to reset to exhaust the pilot 323. When the piston 335 reached its retracted position, it shifted a valve 340 to connect pilot 342 to the air supply line 325, and when the pilot 323 is so exhausted, the valve 322 is shifted back to normal by the pilot 342. The valve 322 then connects the line 327 to exhaust through check valve 343 and also connects pilot 329 to exhaust to shift valve 330 back to normal to connect the line 327 to exhaust. Exhaust of line 327 exhausts pilot 326 to cause valve 328 to be spring returned to normal condition, and the valve 328 connects to pilot 331 to exhaust to reset the valve 334 to normal. The valve 334 then connects the cylinder 233 to the line 325, and the piston 335 is returned back to normal, which releases valve 340 which then is spring returned to normal to connect pilot 342 to exhaust.

It will be appreciated that, while the above-described embodiments, are disclosed as orienting ears of corn, they are also capable of orienting other tapered articles, for example, carrots, and will orient the articles whether they be fully tapered, that is, tapered to substantially a point, or truncated.

What is claimed is:

1. In an apparatus for orienting tapered articles,
   conveyor means for conveying tapered articles endwise along a predetermined path,
   a feeler arm, means mounting the feeler arm pivotally in the path in a position to be engaged and pivoted by the forward end portion of each article and for pivotal movement out of the path at a predetermined velocity by a small end first article and at a substantially higher velocity when engaged by a butt end first article, and detecting means for differentiating between the higher velocity of movement and the lower velocity of movement of the feeler arm.

2. The apparatus of claim 1 including turning means responsive to the detecting means for turning end-for-end the butt end first articles.

3. The apparatus of claim 1 wherein the detecting means includes a velocity transducer and circuit means operable by the transducer.

4. The apparatus of claim 1 wherein the mounting means mounts the feeler pivotally at a predetermined point above the path of the articles.

5. The apparatus of claim 4 including height adjusting means responsive to the diameter of each article for adjusting the height of said point.

6. The apparatus of claim 5 wherein the height adjusting means includes a contact plate engaged by each article in advance of engagement of the feeler by the article and pushed upwardly by the article as the article is moved along the path.

7. In an apparatus for orienting tapered articles, conveyor means for conveying tapered articles endwise along a predetermined path,
feeler means,
means mounting the feeler means pivotally in the path in a position to be engaged and pivoted by the forward end portion of each article and for pivotal movement out of the path at a predetermined velocity by a small end first article and at a substantially higher velocity by a butt end first article,
detecting means for differentiating between the higher velocity of movement and the lower velocity of movement of the feeler means,
and turning means responsive to the detecting means for turning end-for-end the butt end first articles,
the turning means including chute means receiving the articles endwise, and means for gripping the articles at the chute means and inverting them endwise in a predetermined plane.

8. The apparatus of claim 7 wherein said plane is vertical.

9. The apparatus of claim 8 wherein the gripping means includes a pair of discs actuated by the detecting means to grip the forward end of one of the articles, turn the article over and release the article.

10. In an apparatus for orienting ears of corn endwise,
base means,
conveyor means for moving ears of corn endwise past the base means at a substantially constant velocity,
a frame mounted pivotally on the base means at one side of the conveyor means,
a contacting shoe carried by the frame in a position biased into contact with the portion of each ear at a predetermined point along the conveyor means,
a feeler arm carried pivotally by the frame and biased toward a normal position extending at least partially transversely to the conveyor means and into the path of the ears at a point downstream from the shoe and sufficiently that the forward end of each butt-end-first ear engages the arm but not sufficiently for the forward end of each small-end-first ear to engage the arm,
and velocity responsive detecting means actuated by movement of the feeler arm for differentiating between the velocities of movement of the feeler when the feeler arm is pushed by the butt end of the ear and when the feeler arm is pushed by the small end portion of the ear.

11. In an apparatus for orienting tapered articles, first conveying means for conveying articles endwise one after another in a predetermined direction,
a pair of gripping members positioned at the exit end of the first conveying means and at opposite sides of the path of the article,
closing means for closing the gripping members on the articles,
turning means for turning the gripping members to turn the articles gripped thereby end for end,
means for opening the gripping members to release the gripped articles after the articles have been turned end for end,
second conveying means receiving articles from the first conveyor means and the gripping means,
detection means responsive only to ones of the articles that are large end first as the articles arrive at the gripping members,
and actuating means responsive to the detection means for actuating the closing means and the turning means.

12. The apparatus of claim 11 wherein the actuating means serves to time the closing means to grip the forward end portion of the article to move the article forwardly by turning of the article.

13. In an apparatus for orienting ears of corn endwise,
means for advancing ears of corn endwise along a predetermined path in random endwise orientation,
contacting means positioned at a predetermined point along said path and biased into said path and movable out of said path by each ear to an extent proportional to the diameter of the portion of the ear engaged by the contacting means at any given instant,
a pivotal feeler arm movable toward and away from a portion of said path downstream from said predetermined point by the contacting means and biased toward a position extending substantially into the path of the end of a butt-end-first ear engaged by the contacting means and not extending into the path of the end of a small-end-first ear engaged by the contacting means, whereby the feeler arm is engaged by and moved out of the path at a predetermined slow velocity by a small-end-first ear and is moved out of the path at a substantially higher velocity when engaged by a butt-end-first ear,
and detecting means for differentiating between said velocities.

14. The apparatus of claim 13 wherein the detecting means includes a variable inductance transducer.

15. The apparatus of claim 13 including pivotal frame means carrying the contacting means, the feeler arm and the inductance means.

16. The method of orienting tapered articles comprising moving a line of tapered articles endwise one after another at a predetermined rate of speed into engagement with a movable feeler member to move the feeler out of the path at a velocity dependent on the diameter of the forward end of the article engaging the member,
measuring the velocity of the movement of the member upon each movement thereof,
and distinguishing the butt-end-first articles from the tapered-end-first articles by the difference in the velocities.

* * * * *